July 23, 1968 E. MOSER 3,393,855
HOLDER AND SAPPHIRE CAPILLARY TIP FOR THERMAL COMPRESSION AND ULTRASONIC BONDING
Filed July 6, 1966

INVENTOR
ERNEST MOSER
BY Joseph F. Cole
ATTORNEY 3,393,855

HOLDER AND SAPPHIRE CAPILLARY TIP FOR THERMAL COMPRESSION AND ULTRASONIC BONDING

Ernest Moser, % Swiss-Craft, 2625 Fair Oaks Ave., Redwood City, Calif. 94063

Filed July 6, 1966, Ser. No. 563,165
6 Claims. (Cl. 228—44)

An important requirement in the manufacture of semiconductors is that of connecting fine gold or aluminum lead wires to micro-miniature terminals and bonding pads, Standard techniques, such as soldering or welding, are prohibited for this application, since fine wire is often as small as .0007" in diameter and most semi-conductor terminals fall in the .005" wide category.

The most popular technique today for joining fine wire leads to semi-conductor bonding pads and terminals is that of thermal compression bonding. In this process, gold or aluminum lead wire is threaded through a hollow, cone-shaped tool, called a "capillary." This capillary is mounted in a holder and stationed slightly above the semi-conductor being fabricated. The same semi-conductor rests upon a small heated stage which can be easily moved for alignment.

It is common practice to form the capillary tip from tungsten. However, the use of tungsten presents several disadvantages. First, a mixture of sulfuric and nitric acids is used for ordinary cleaning of the capillary tip, and these acids will eat into the tungsten. Second, it is difficult to introduce the acids into the relative small bore of the capillary tip. Third, when the wire is drawn sideways, the lower part of the capillary tip around the bore will wear rapidly. Fourth, the outside of the capillary tip wears rapidly and it is difficult to repolish. Ffth, the wire wears grooves in the bore of the capillary tip in which the wire will stick. Sixth, the tungsten rubs off onto the wire, the wire is contaminated and is no longer acceptable. Seven, in many contracts, the use of tungsten is prohibited. Eight, the tungsten is opaque and the cleaning of the bore cannot be observed.

Also, it is common practice to form capillary tips from glass, and this will permit the cleaning of the bore to be observed. However, glass capillary tips have disadvantages. First, the glass tips will break readily. Second, the expense of constant replacement of glass capillary tips is serious. Third, the long bore in glass tips is difficult to clean.

Accordingly, I have proposed to form the capillary tips from sapphire and actual tests disclose several advantages over tungsten and glass. First, sapphire is transparent and the cleaning of the bore can be observed. Second, the lower edges of the capillary tip around the bottom of the bore do not wear, since sapphire is the hardest mineral except diamond. Third, sapphire will take a good polish on both the inside and outside of the capillary tip. Fourth, the wire does not wear the polish off of the capillary tip. Fifth, the tests show that considerable more work may be accomplished with sapphire tips without any trace of wear, and without requiring cleaning, repolishing, or any other time-consuming process.

*Drawing*

For a better understanding of my invention, reference should be had to the accompanying drawing, forming part of this specification, in which.

Figure 1:
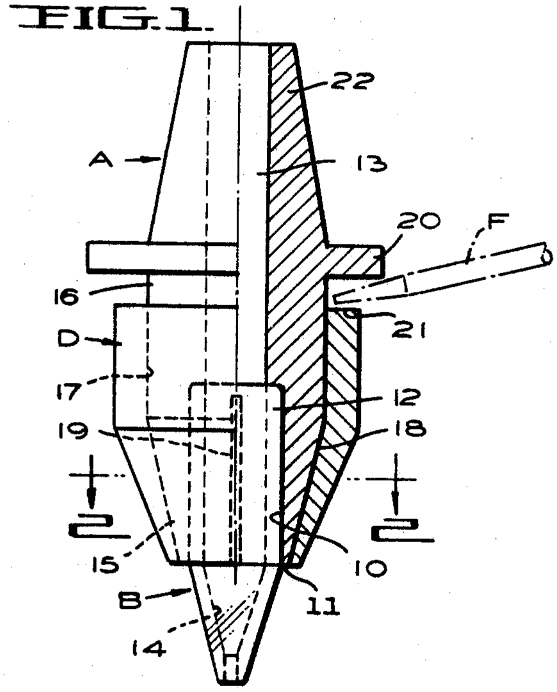
FIG. 1 is an enlarged elevational view of my holder and capillary tip, parts being shown in section.

FIGS. 4 to 7, inclusive, illustrate four consecutive steps in using my holder and capillary tip for thermal compression and ultrasonic bonding.

While I have shown only the preferred embodiment of my invention, it should be understood that various changes, or modifications, may be made within the scope of the appended claims without departing from the spirit thereof.

*Detailed description*

Referring now to the drawing in detail, I have disclosed a holder indicated generally at A having a socket 10 extending upwardly thereinto from a lower end 11. It will be noted that a capillary tip B made from transparent sapphire has its upper end portion 12 secured in the socket 10 of the holder A so as to be movable therewith.

As clearly illustrated in FIG. 1, the holder A and the capillary tip B are provided with bores 13 and 14, respectively, through which a fine wire C, such as gold or aluminum, may be advanced for thermal compression and ultrasonic bonding, this wire being disclosed in FIGS. 4 to 7, inclusive.

Moreover, a clamp D is provided on the lower portion of the holder A and operable to compress the latter against the upper end portion 12 of the capillary tip B. In this connection, it will be seen that the lower exterior portion 15 is frusto-conical, and that the holder is provided with an exterior intermediate cylindrical portion 16 disposed above the frusto-conical lower end portion 15.

Figure 2:
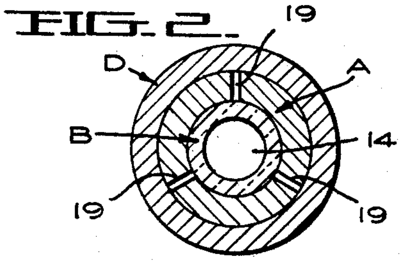
FIG. 2 is a horizontal sectional view taken along the plane 2—2 of FIG. 1.
Figure 3:
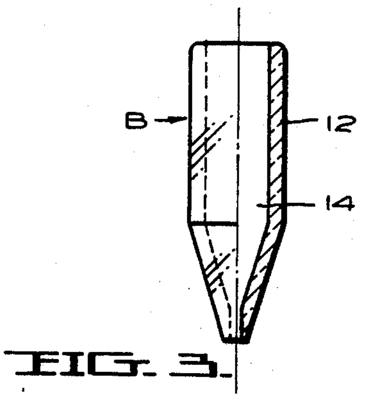
FIG. 3 is an elevational view, partly in section, of the capillary tip taken by itself.

The clamp D is in the nature of a sleeve and is telescoped over the holder A; it has an upper cylindrical bore portion 17 dimensioned to bear against the exterior intermediate cylindrical portion 16 of the holder A. This sleeve clamp D has a frusto-conical lower bore portion 18 dimensioned to bear against the lower exterior frusto-conical portion 15 of the holder A so as to compress the latter against the capillary tip B, when this sleeve clamp is pressed over the holder. The lower frusto-conical portion 15 of the holder A is slotted, as at 19, so as to facilitate compressing thereof by the sleeve clamp D (see FIGS. 1 and 2).

As a further structural feature, it will be seen that the holder A has an annular flange 20 projecting outwardly therefrom above the sleeve clamp D, and the latter has an exposed rim 21 at its top spaced below the flange of the holder, whereby a prying tool E may be inserted between this flange and rim for removing the sleeve clamp D from the holder A. The holder is formed with a tapered upper end 22 for attachment to a machine (not shown) so that the holder A and its capillary tip B may be moved up and down.

*Summary of operation*

Figure 4:
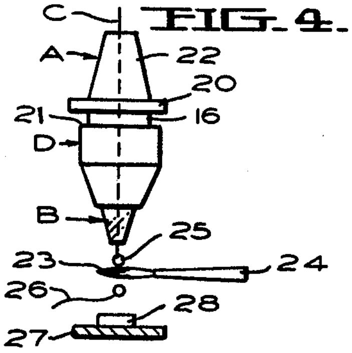

As shown in FIG. 4, the first step of bonding is to sever the gold wire C a short distance below the capilary tip B with the flame 23 of a small torch 24. The severing action leaves the end of the wire widened into a ball 25. The remanent 26 of the severed wire is discarded.

Figure 5:
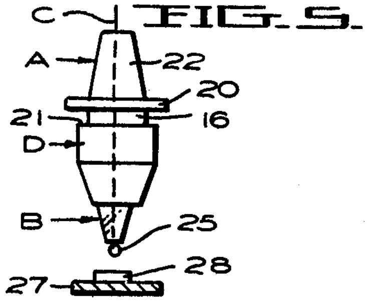

The second step is shown in FIG. 5, wherein the holder A and the capillary tip B is lowered toward a bonding pad 27 (heated stage) on which a semi-conductor material 28 has been placed. The lower end of the tip B contacts the balled end 25 of the wire C about midway of its down stroke, drawing the wire down through the bores 13 and 14 of the holder and tip, respectively.

Figure 6:
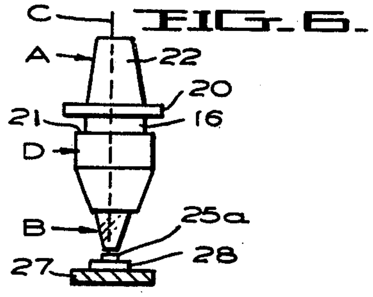

The third step is shown in FIG. 6, wherein at the bottom of its stroke, the capillary tip B forces the balled end 25 of the wire C against the heated semi-conductor 28 forming a nail head formation 25a. The combination of heat and pressure effects instantaneous molecular diffusion or welding, bonding the lead wire C to the material or terminal 28. It may be pointed out that when bonding with aluminum wire, the process varies slightly. Because of the characteristics of aluminum, the end of the wire remains smooth when severed by a torch. Because of this, the aluminum wire, by various methods, is bent at a 90° angle to the capillary tip B, as the latter is brought down.

Figure 7:
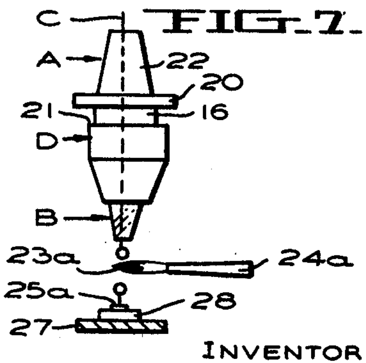

The fourth step is shown in FIG. 7, and after the weld is complete, the holder A and its capillary tip B are retracted upwardly, and the wire C is again severed by the flame 23a of a torch 24a, and the process is repeated as required.

The basic simplicity of thermal compression bonding enables the semi-conductor manufacturer to achieve a high rate of lead-attach production, utilizing non-technical personnel and low-cost equipment. Each bonding operation is completed in seconds and offers a high degree of reliability.

In using the word "sapphire," the kindred materials, known by other names (corundums), but of the same nature, such as ruby, are to be included.

I claim:

1. In a holder and sapphire capillary tip for thermal compression and ultrasonic bonding:
   (a) a holder having a capillary tip secured thereto so as to be movable therewith;
   (b) the capillary tip being made from sapphire and having a bore through which a wire may be advanced for thermal compression and ultrasonic bonding operations.

2. The holder and sapphire capillary tip, as set forth in claim 1;
   (c) and in which the capillary tip is transparent so that its bore may be observed from the exterior of the tip.

3. The holder and sapphire capillary tip, as set forth in claim 1;
   (c) and in which the holder has a socket extending upwardly thereinto from a lower end thereof;

(d) the capillary tip having an upper end portion thereof inserted into the socket of the holder;
   (e) and a clamp provided on the lower portion of the holder and operable to compress the latter into engagement with the upper portion of the inserted capillary tip.

4. The holder and sapphire capillary tip, as set forth in claim 3;
   (f) and in which the lower exterior portion of the holder is frusto-conical, and the holder is provided with an exterior intermediate cylindrical portion disposed above the frusto-conical lower portion thereof;
   (g) and the clamp defining a sleeve telescoped over the holder and having an upper cylindrical bore portion dimensioned to bear against the exterior intermediate cylindrical portion of the holder;
   (h) and this sleeve clamp having a frusto-conical lower bore portion dimensioned to bear against the lower exterior frusto-conical portion of the holder so as to compress the latter against the capillary tip, when the sleeve clamp is pressed over the holder.

5. The holder and sapphire capillary tip, as set forth in claim 4;
   (i) and in which the lower frusto-conical portion of the holder is slotted as as to facilitate compressing thereof by the sleeve clamp.

6. The holder and sapphire capillary tip, as set forth in claim 4;
   (i) and in which the holder has an annular flange projecting outwardly therefrom above the sleeve clamp, and the latter has an exposed rim at its top spaced below the flange, whereby a prying tool may be inserted between the flange and the rim for removing the clamp from the holder.

References Cited

UNITED STATES PATENTS 3,125,906 3/1964 Johnson ---------- 228—44 X

RICHARD H. EANES, Jr., *Primary Examiner.*